United States Patent
Li et al.

(10) Patent No.: US 11,050,053 B2
(45) Date of Patent: Jun. 29, 2021

(54) BATTERY

(71) Applicant: Contemporary Amperex Technology Co., Limited, Ningde (CN)

(72) Inventors: Wei Li, Ningde (CN); Haihao Shi, Ningde (CN); Huihui Liu, Ningde (CN); Chao Jin, Ningde (CN); Tianyi Gao, Ningde (CN); Jianbao Xu, Ningde (CN); Shisong Li, Ningde (CN); Chao Guo, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 139 days.

(21) Appl. No.: 16/422,872

(22) Filed: May 24, 2019

(65) Prior Publication Data

US 2020/0161640 A1 May 21, 2020

(30) Foreign Application Priority Data

Nov. 16, 2018 (CN) .......................... 201811367724.4

(51) Int. Cl.
*H01M 4/36* (2006.01)
*H01M 4/62* (2006.01)
*H01M 4/02* (2006.01)

(52) U.S. Cl.
CPC .......... *H01M 4/366* (2013.01); *H01M 4/622* (2013.01); *H01M 2004/021* (2013.01); *H01M 2004/028* (2013.01)

(58) Field of Classification Search
None
See application file for complete search history.

(56) References Cited

U.S. PATENT DOCUMENTS

| | | | | |
|---|---|---|---|---|
| 2016/0380263 A1* | 12/2016 | Nakayama | ............ | H01M 4/525 429/223 |
| 2017/0018770 A1 | 1/2017 | Hori et al. | | |
| 2017/0092943 A1* | 3/2017 | Li | ............ | H01M 4/139 |

FOREIGN PATENT DOCUMENTS

| | | |
|---|---|---|
| CN | 101740747 A | 6/2010 |
| CN | 103165856 A | 6/2013 |

(Continued)

OTHER PUBLICATIONS

PCT International Search Report for PCT/CN2019/118694, dated Jan. 23, 2020, 10 pages.

(Continued)

*Primary Examiner* — Wyatt P McConnell
(74) *Attorney, Agent, or Firm* — Law Offices of Liaoteng Wang

(57) ABSTRACT

The present invention relates to a battery, comprising a positive electrode plate, a separator and a negative electrode plate, wherein the positive electrode plate comprises a positive electrode current collector and at least two layers of positive active materials on at least one surface of the positive electrode current collector in which the underlying positive active material layer in contact with the positive electrode current collector comprises a first positive active material, a first polymer material, and a first conductive material and in which the upper positive active material layer comprises a second positive active material, a second polymer material, and a second conductive material and the first polymer material comprises an oil-dispersible polymer material having a solubility in NMP at 130° C. for 5 minutes, which is 30% or less of the solubility of PVDF under the same conditions. The battery exhibits good safety performance and improved electrical performance.

12 Claims, 1 Drawing Sheet

(56) References Cited

FOREIGN PATENT DOCUMENTS

| CN | 105703010 A | 6/2016 |
|---|---|---|
| CN | 106941149 A | 7/2017 |
| EP | 3147971 A1 | 3/2017 |
| EP | 3483907 A1 | 5/2019 |
| KR | 20170142024 A | 12/2017 |
| TW | 201836196 A | 10/2018 |

OTHER PUBLICATIONS

The extended European search report dated Feb. 17, 2020 for European application No. 19177478.5, 19 pages.
The partial European search report dated Nov. 14, 2019 for European application No. 19177478.5, 23 pages.
The Examination report dated Jun. 24, 2020 for European application No. 19177478.5, 11 pages.
The First Office Action and search report dated Sep. 2, 2020 for Chinese application No. 201811367724.4, 15 pages.
The Second Office Action and search report dated Nov. 25, 2020 for Chinese application No. 201811367724.4, 8 pages.

* cited by examiner

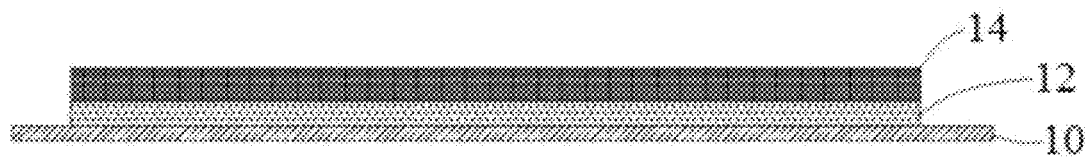

BATTERY

CROSS-REFERENCE TO RELATED APPLICATION

This application is based on and claims priority to Chinese Patent Application No. 201811367724.4 filed on Nov. 16, 2018, which is incorporated herein by reference in its entirety.

TECHNICAL FIELD

The present application belongs to the field of electrochemical technology, and more particularly, the present application is directed to a battery.

BACKGROUND

Lithium-ion batteries are widely used in electric vehicles and consumer electronics because of their high energy density, high output power, long cycle life and small environmental pollution. However, lithium-ion batteries are prone to fire and explode when subjected to abnormal conditions such as crushing, bumping or puncture, thereby causing serious harm. Therefore, the safety problem of lithium-ion batteries greatly limits the application and popularity of the lithium-ion batteries.

Although researchers have proposed many ways to improve safety performance of batteries, there is still no very effective means for solving the safety hazard caused by the puncture of batteries. In view of this, it is indeed necessary to provide a battery that has improved safety performance, especially during nail penetration.

SUMMARY

An object of the present invention is to provide a battery with improved safety performance, especially during nail penetration.

A further object of the present invention is to provide a battery with good safety performance, improved electrical performance, easy processing and the like.

The present application provides a battery, comprising a positive electrode plate, a separator and a negative electrode plate, wherein the positive electrode plate comprises a positive electrode current collector and at least two layers of positive active materials on at least one surface of the positive electrode current collector in which the underlying positive active material layer in contact with the positive electrode current collector includes a first positive active material, a first polymer material, and a first conductive material, and based on the total weight of the underlying positive active material layer, the weight percentage of the first positive active material is A%, the weight percentage of the first polymer material is B%, and the weight percentage of the first conductive material is C% and in which the upper positive active material layer in contact with the underlying positive active material layer and away from the positive electrode current collector includes a second positive active material, a second polymer material, and a second conductive material, based on the total weight of the upper positive active material layer, the weight percentage of the second positive active material is A'%, the weight percentage of the second polymer material is B'%, and the weight percentage of the second conductive material is C'% wherein A%<A'%, B%>B'%, and C%>C'% and the first polymer material comprises an oil-dispersible polymer material having a solubility in NMP at 130° C. for 5 minutes, which is 30% or less of the solubility of PVDF under the same conditions.

The present battery exhibits good safety performance and improved electrode performance.

DESCRIPTION OF THE DRAWINGS

The battery and its beneficial effects of the present invention will be described in detail below with reference to the accompanying drawings and specific embodiments.

FIG. 1 is a schematic structural view of the positive electrode plate of the battery according to an embodiment of the present application, in which 10—a positive electrode current collector; 14—an upper positive active material layer; 12—a underlying positiveactive material layer.

DETAILED DESCRIPTION

A large number of experimental results show that internal short circuit of battery is the root cause of the safety hazard of lithium-ion batteries. The root cause of internal short circuit of battery is the electrical connection between the positive electrode plate and the negative electrode plate inside the battery. In the abnormal situation such as nail penetration, the direct contact of metal burrs (usually Al metal burr) generated in the positive electrode plate with the negative electrode plate can cause internal short circuit of battery. The present inventors have found that metal burrs of the positive electrode plate can be effectively masked (or wrapped) by designing the coatings on the positive electrode plate, thereby preventing internal short circuit and the resulting thermal runaway of the battery.

The present invention discloses a battery comprising a positive electrode plate, a separator and a negative electrode plate. The positive electrode plate of the present battery comprises a positive electrode current collector and at least two layers of positive active materials on at least one surface of the positive electrode current collector. Since the at least two layers of the positive active materials are usually tightly bonded together after being formed on the current collector respectively, a whole coating will be obtained generally if the coating is peeled off from the current collector. Therefore, the at least two layers of the positive active materials are collectively referred to as a positive electrode film layer.

The underlying positive active material layer in contact with the positive electrode current collector includes a first positive active material, a first polymer material, and a first conductive material, based on the total weight of the underlying positive active material layer, the weight percentage of the first positive active material is A%, the weight percentage of the first polymer material is B%, and the weight percentage of the first conductive material is C%.

The upper positive active material layer in contact with the underlying positive active material layer and away from the positive electrode current collector includes a second positive active material, a second polymer material, and a second conductive material, based on the total weight of the upper positive active material layer, the weight percentage of the second positive active material is A'%, the weight percentage of the second polymer material is B'%, and the weight percentage of the second conductive material is C'%.

A%<A'%, B%>B'%, and C%≥C'% and the first polymer material comprises an oil-dispersible polymer material having a solubility in NMP at 130° C. for 5 minutes, which is 30% or less of the solubility of PVDF under the same conditions.

That is to say, the content of the polymer material and of the conductive material in the underlying positive active material layer are both higher than those in the upper positive active material layer. Since the underlying positive active material layer contains a relatively high content of the first polymer material, the underlying positive active material layer has the characteristic of a binding layer compared with the upper positive active material layer, so that the underlying positive active material layer can wrap metal burrs that may be generated in the current collector to effectively prevent internal short circuit of battery under abnormal conditions such as nail penetration.

Preferably, the binding force between the positive electrode film layer and the positive electrode current collector is 10 N/m or more. If the binding force is insufficient, the underlying positive active material layer may not effectively wrap metal burrs that may be generated in the current collector.

Therefore, the underlying positive active material layer is disposed between current collector and the upper positive active material layer, and functions as a binding layer in the form of a primer layer, thereby greatly improving the safety performance of the battery.

In a preferred embodiment of the present invention, the positive active materials is in the form of two layers. That is, it is only consisted of an upper positive active material layer and an underlying positive active material layer. Such a structure facilitates simplification of the manufacturing process.

FIG. 1 shows a schematic structural view of a positive electrode plate according to some embodiments of the present invention, wherein 10—a current collector, 14—an upper positive active material layer, 12—an underlying positive active material layer.

It is easily understood that although the positive active material layer is provided on only one side of the positive electrode current collector 10 as shown in FIG. 1, in other embodiments, the upper positive active material layer 12 and the underlying positive active material layer 14 may be disposed on both sides of the positive electrode current collector 10.

Since the underlying positive active material layer disposed between the current collector and the upper positive active material layer has high ductility, it can play the role of wrapping current collector and metal burrs generated in the current collector under abnormal conditions such as nailing, to prevent the metal burrs or current collector from directly contacting electrode, so that the safety performance of battery during nail penetration is improved.

It was found by the inventors that if a binding layer composed of a conventional polymer material (for example, PVDF) and a conductive material is provided between a current collector and a upper positive active material layer, although the safety performance during nail penetration may be improved, the following side functions may occur: i) there may be a cracking problem of the upper positive active material layer, ii) DCR (DC internal resistance) of the battery may be deteriorated and iii) the binding layer (underlying positive active material layer) may be easily deformed after the upper positive active material layer is compacted, so that it fails to improve safety performance effectively.

In order to overcome the above drawbacks, the present invention proceeds from various aspects, and adopts various technical means to cooperatively improve the performance and stability of the binding layer disposed between current collector and positive active material layer.

The particular composition and structure of the positive electrode plate in the battery according to the present invention will be separately described below.

I. Underlying positive active material layer

The inventors have found that stability of the underlying positive active material layer and its performance as a binding layer can be improved by selecting a first polymer material of the underlying positive active material layer. The underlying positive active material comprises a first positive active material, a first polymer material and a first conductive material.

1) Matrix Material of the Present Underlying Positive Active Material

In the positive electrode plate as disclosed in the present invention, the binding layer matrix material in its underlying positive active material layer is an oil-dispersible polymer material having a solubility in NMP at 130° C. for 5 minutes which is 30% or less of the solubility of PVDF under the same conditions.

If a conventional polymer material (for example, PVDF) is used and no choice is made on the binding layer matrix material, the following technical problems would easily occur:

(1) When an upper positive active material layer is applied over the underlying positive active material layer, the organic solvent (such as NMP or the like) in the slurry of the upper positive active material layer and the electrolyte will dissolve and swell the polymer material in the underlying positive active material layer. If the extent of dissolution and swelling is large, the upper positive active material layer is likely to be cracked due to uneven stress in the case of fast coating speed, thereby seriously affecting production and production efficiency; and (2) if the extent of dissolution and swelling is large, the DCR of the battery may be deteriorated due to the introduction of the underlying positive active material layer, which is disadvantageous to the improvement of dynamic performance of the battery.

Therefore, in the present invention, an oil-dispersible polymer material having a solubility in NMP at 130° C. for 5 min which is 30% or less of the solubility of PVDF under the same conditions is used as a binding layer matrix material, and the binding layer matrix material acts as "an insoluble component", which may be effective in hindering dissolution and swelling of an organic solvent (such as NMP or the like) and an electrolyte thereto, thereby solving problems of cracking and DCR deterioration of the battery.

The binding layer matrix material is selected from at least one of polyacrylonitrile, polyacrylic acid, polyacrylate, polyacrylic acid-acrylate, polyacrylonitrile-acrylic acid, and polyacrylonitrile-acrylate.

In the present invention, a water dispersible polymer material refers to such a polymer in which its molecular chain can be completely extended and dispersed in water, and an oil dispersible polymer material refers to such a polymer in which its molecular chain may be completely extended and dispersed in an oil solvent. Those skilled in the art would understand that one kind of polymer material can be separately dispersed in water and oil by using a suitable surfactant. In other words, by using a suitable surfactant, one kind of polymer material can be made into a water dispersible polymer material and an oil dispersible polymer material, respectively. For example, those skilled in the art can appropriately select an oil dispersible polyacrylonitrile or an oil dispersible polyacrylate as a binding layer matrix material, i.e. insoluble polymer material as needed.

In order to enhance the binding force between the underlying positive active material layer and the current collector, the underlying positive active material layer may further comprise a polymer binder. In other words, the first polymer material comprises a binding layer matrix and optionally a polymer binder.

In order to make the above-mentioned binding layer matrix to play a more obvious role of "inhibiting dissolution and swelling", it is preferable that the weight percentage of the binding layer matrix is 20% by weight or more with respect to the total weight of the underlying positive active material layer.

2). Materials for the Present Binder

Since the action mechanism of the underlying positive active material layer of the present invention is to improve safety performance of positive electrode plate and electrochemical device during nail penetration by wrapping current collector and metal burrs generated in the current collector under abnormal conditions such as nailing, the binding force between the underlying positive active material layer and the current collector should not be too small, otherwise it may not be possible to ensure that current collector and metal burrs generated in the current collector are effectively and reliably wrapped under abnormal conditions such as nailing penetration.

In order to increase the binding force between the underlying positive active material layer and the current collector, the inventors have found that a polymer binder can be added to the underlying positive active material layer. The binder may be fluorinated polyolefin and/or chlorinated polyolefin. In the present invention, the fluorinated polyolefin and/or chlorinated polyolefin is polyvinylidene fluoride (PVDF), polyvinylidene chloride (PVDC), modified PVDF and/or modified PVDC. For example, the fluorinated polyolefin and/or chlorinated polyolefin may be selected from at least one of PVDF, carboxylic acid modified PVDF, acrylic acid modified PVDF, a PVDF copolymer, PVDC, carboxylic acid modified PVDC, acrylic acid modified PVDC, and a PVDC copolymer.

The addition of the above binder has a significant effect on improvement of the safety performance during nail penetration.

Of course, based on the selected binding layer matrix material, it is also possible to choose not to add any binder.

Based on the weight of the first polymer material being 100% (i.e., relative to the total weight of the first polymer material), the binding layer matrix is present in an amount of 30% by weight to 100% by weight, and the polymer binder is present in an amount of from 0% by weight to 70% by weight.

In the case that the content of the first conductive material and the first inorganic filler is constant, if the content of the binder is too high, the content of the binding layer matrix as "insoluble component" may be too low, and it is impossible to completely solve the problems of cracking of coating and deterioration of DCR of the battery.

Preferably, the weight percentage of the fluorinated polyolefin and/or the chlorinated polyolefin is not less than 15% by weight based on the total weight of the underlying positive active material layer being 100%. In such an amount, the binding force between the underlying positive active material layer and the current collector is strong, and the safety performance during nail penetration is improved obviously.

The fluorinated polyolefin and/or chlorinated polyolefin in the underlying positive active material layer is optionally cross-linked.

In order to make the underlying positive active material layer to have good ductility meanwhile having good electrical conductivity and stability both, the weight percentage of the polymer material is usually from 35 wt % to 75 wt %, preferably from 40 wt % to 75 wt %, more preferably from 50 wt % to 75 wt % relative to the total weight of the underlying positive active material layer wherein the total weight of a first polymer material, a first conductive material, a first positive active material, and optionally other auxiliary agents is regarded as 100%.

Secondly, the inventors have found that the first positive active material in the underlying positive active material layer may serve as an inorganic filler to stabilize the underlying positive active material layer.

It has been found that in the case that the underlying positive active material layer does not contain an inorganic filler, the solvent (such as NMP or the like) in the upper positive active material layer or the electrolyte over the underlying positive active material layer may adversely dissolve and swell the polymer material in the underlying positive active material layer, thereby damaging the underlying positive active material layer and affecting its stability. After adding an inorganic filler, the inorganic filler as a barrier can advantageously eliminate the above-mentioned adverse effects such as dissolution and swelling, and thus it is advantageous for stabilizing the underlying positive active material layer. In addition, it has also been found that the addition of the inorganic filler is also advantageous for ensuring that the underlying positive active material layer is not easily deformed during compaction of the electrode plate. Therefore, the addition of the inorganic filler can well ensure that the underlying positive active material layer is stably disposed between the current collector and the upper positive active material layer and that the current collector is prevented from directly contacting the upper positive active material layer, thereby improving safety performance of the battery.

The first positive active material contained in the underlying positive active material layer acts as a barrier, thereby eliminating the adverse effects such as dissolution and swelling of a solvent (such as NMP or the like) in the upper positive active material layer or an electrolyte on the polyvinylidene fluoride and/or the polyvinylidene chloride in the first polymer material and stabilizing the underlying positive active material layer.

It has also been found that the presence of the first positive active material in the underlying positive active material layer is also advantageous in ensuring that the underlying positive active material layer is not easily deformed during the plate compaction process. Therefore, it can be well ensured that the underlying positive active material layer is stably between the current collector and the upper positive active material layer, preventing the current collector from directly contacting the upper positive active material layer, thereby improving the safety performance of the battery.

In summary, the first positive active material in the underlying positive active material layer can function to stabilize and improve the underlying positive active material layer as a binding layer from the following two aspects:

(1) to eliminate the adverse effects such as dissolution and swelling of solvent (such as NMP or the like) in the upper positive active material layer or the electrolyte on the polymer material such as fluorinated polyolefin and/or chlorinated polyolefin in the underlying positive active material layer; and (2) to ensure that the underlying positive active material layer is not easily deformed during compaction of the electrode plate, thereby preventing the current collector from directly contacting the upper positive active material layer.

With respect to the total weight of the underlying positive active material layer, the weight percentage A% of the first positive active material usually meets 10 wt % ≤ A% ≤ 60 wt %. If the content is too low, it is not enough to stabilize the underlying positive active material layer; if the content is too high, it will affect PTC performance of the underlying positive active material layer. The weight percentage of the first positive active material is preferably from 15% by weight to 45% by weight.

The inventors have found that many other inorganic fillers can have similar technical effects in addition to the first positive active material, for example at least one of a metal oxide, a non-metal oxide, a metal carbide, a non-metal carbide, and an inorganic salt, or at least one of a conductive carbon coating modified above material, a conductive metal coating modified above material or a conductive polymer coating modified above material.

For example, the other inorganic fillers may be selected from at least one of magnesium oxide, aluminum oxide, titanium dioxide, zirconium oxide, silicon dioxide, silicon carbide, boron carbide, calcium carbonate, aluminum silicate, calcium silicate, potassium titanate, barium sulfate.

However, the inventors have found that it is particularly advantageous if a positive electrochemically active material (i.e. the first positive active material) or a conductive carbon coating modified above material, a conductive metal coating modified above material or a conductive polymer coating modified above material is used instead of other inorganic fillers. In such a case, the first positive active material may further exert the following two functions:

(1) to improve overcharge performance of the battery. Since an electrochemically active material (i.e. a first positive active material) has the characteristics of lithium ion intercalation, it will delithiate, and the de-lithiating process has become more and more difficult, and thus impedance is increasing. Therefore, when current passes, heat-generating power increases, and the temperature of the binding layer increases faster, so the volume of the polymer material in the underlying active material layer is increased and the conductive network composed of the conductive material in the underlying active material layer is "destroyed", and thus the resistance in the binding layer is increased. Thus the battery overcharge safety performance may be improved.

(2) to contribute charge and discharge capacity. Since an electrochemically active material (i.e. a first positive active material) can contribute a certain charge and discharge capacity at the normal operating temperature of the battery, the effect of the underlying positive active material layer on electrochemical performance such as capacity of the battery at the normal operating temperature can be dropped to be lowest.

The first positive active material may be selected from at least one of lithium cobalt oxide, lithium nickel manganese cobalt oxide, lithium nickel manganese aluminum oxide, lithium iron phosphate, lithium vanadium phosphate, lithium cobalt phosphate, lithium manganese phosphate, lithium manganese iron phosphate, lithium iron silicate, lithium vanadium silicate, lithium cobalt silicate, lithium manganese silicate, spinel lithium manganese oxide, spinel lithium nickel manganese oxide, lithium titanate, or a conductive carbon coating modified above material, a conductive metal coating modified above material or a conductive polymer coating modified above material. The first positive active material is preferably is at least one of lithium iron phosphate, lithium vanadium phosphate, lithium cobalt phosphate, lithium manganese phosphate, lithium manganese iron phosphate or conductive carbon coating modified above materials, conductive metal coating modified above materials or conductive polymer coating modified above materials. Two reasons are that lithium iron phosphate, lithium vanadium phosphate, lithium cobalt phosphate, lithium manganese phosphate, lithium manganese iron phosphate and the like have high safety performance, and do not release oxygen when overcharged; and that relative to lithium cobalt oxide, lithium nickel manganese cobalt oxide and other materials, the increase of above materials in resistance is larger when overcharged, so that the primer layer i.e. the underlying positive active material layer generates more heat, to render the underlying positive active material layer to "perform" PTC effect rapidly.

When the particle size of the first positive active material is too small, it will have increased specific surface area and thus side reaction will increase; when the particle size of the first positive active material is too large, the application thickness of the underlying positive active material layer is too large and the coating is not easy to be even. Preferably, the average particle diameter D of the first positive active material in the underlying positive active material layer fulfils the relationship of 100 nm ≤D≤10 μm, more preferably 1 μm ≤D≤6 μm. When the particle size of the first positive active material is in the above range, it may also improve the effect of blocking the conductive network at high temperature, thereby improving the response speed of the underlying positive active material layer.

It is also preferred that the first positive active material in the underlying positive active material layer has a specific surface area (BET) of not more than 500 m$^2$/g. When the specific surface area of the first positive active material increases, side reaction will increase and thus the battery performance will be affected. Moreover, in the case that the specific surface area of the first positive active material is too large, a higher proportion of binder will be required to be consumed, which will cause the binding force among the underlying positive active material layer, the current collector and the upper positive active material layer to be reduced and the growth rate of the internal resistance to be high. When the specific surface area (BET) of the first positive active material is not more than 500 m$^2$/g, a better overall effect can be provided.

As a further improvement of the present invention, when the conductivity σ of the first positive active material satisfies $10^{-3}$ S/m≤σ≤$10^2$ S/m, it would produce an additional benefit. The inventors have found that the addition of the first positive active material affects the conductive performance of the binding layer, which in turn may affect the conductivity of the whole electrode plate. When the conductivity σ of the first positive active material satisfies $10^{-3}$ S/m≤σ≤$10^2$ S/m, the conductivity of the underlying positive active material layer at the normal temperature of the battery can be improved. If the conductivity of the first positive active material is too small, the initial internal resistance and internal resistance increasing rate of the underlying positive active material layer will increase rapidly; if the σ is too high, the conductive network is not easily cut, which is not conducive to improving the safety performance in terms of overcharge and nail penetration.

Those skilled in the art can understand that if the conductivity σ of some first positive active materials does not satisfy $10^{-3}$ S/m≤σ≤$10^2$ S/m, it can satisfy above requirement by the common material modification or modification means used in the art.

Thirdly, the inventors have found that controlling the content of the first conductive material in the underlying positive active material layer is beneficial to further optimizing safety performances of the underlying positive active material layer.

In addition to the first polymer material and the first positive active material, the underlying positive active material layer disposed between the current collector and the upper positive active material layer further comprises a first conductive material.

In order to ensure that battery may perform an electrochemical reaction under normal operation conditions, the underlying positive active material layer must contain a certain amount of conductive material. If the content of the conductive material is too low, it is not conducive to the electrochemical reaction of battery under normal operation conditions, and the internal resistance is too large; if the content of the conductive material is too high, the conductive network is not easily damaged, which is disadvantageous for improving overcharge safety performance of battery.

In the present invention, the weight percentage C% of the first conductive material fulfils $5 \text{ wt \%} \leqslant C\% \leqslant 25 \text{ wt \%}$, preferably $5 \text{ wt \%} \leqslant C\% \leqslant 20 \text{ wt \%}$ with respect to the total weight of the underlying positive active material layer.

Preferably, the weight ratio of the first polymer material to the first conductive material is 2 or more, more preferably above weight ratio is 3 or more and 8 or less.

The first conductive material may be selected from at least one of a conductive carbon-based material, a conductive metal material, and a conductive polymer material, wherein the conductive carbon-based material is selected from at least one of conductive carbon black, acetylene black, graphite, graphene, carbon nanotubes, carbon nanofibers; the conductive metal material is selected from at least one of Al powder, Ni powder, and gold powder; and the conductive polymer material is selected from at least one of conductive polythiophene, conductive polypyrrole, and conductive polyaniline. The first conductive materials may be used alone or in combination of two or more.

The first conductive materials are typically used in the form of powders or granules. The particle size may be 5 nm to 500 nm, for example, 10 nm to 300 nm, 15 nm to 200 nm, 15 nm to 100 nm, 20 nm to 400 nm, 20 nm to 150 nm, or the like, depending on the specific application environment.

The underlying positive active material layer of the present invention can be formed by a conventional method. For example, the underlying positive active material layer may be obtained by dissolving a first polymer material, a first conductive material, a first positive active material, and optionally other auxiliary agents in a solvent and stirring them to form a slurry, and then applying the slurry over a current collector followed by heating and drying.

In some preferred embodiments of the present invention, the present underlying positive active material layer may consist essentially of the first polymer material including a binding layer matrix and an optionally binder, the first conductive material, and the first positive active material, i.e., it does not contain a significant amount (e.g., a content of or $\leqslant 3\%$, $\leqslant 1\%$, or $\leqslant 0.5\%$) of other components.

In the positive electrode plate of the present invention, the underlying positive active material layer is directly adhered to current collector and disposed between the current collector and the upper positive active material layer. The thickness H of the underlying positive active material layer can be reasonably determined according to actual needs. The thickness H of the underlying positive active material layer is usually not more than 40 µm, preferably not more than 25 µm, more preferably not more than 20 µm, 15 µm or 10 µm. The thickness of the underlying positive active material layer is usually greater than or equal to 1 µm, preferably greater than or equal to 2 µm, and more preferably greater than or equal to 3 µm. If the thickness is too small, it is not enough to ensure that the underlying positive active material layer has the effect of improving safety performance of the battery; if it is too large, the internal resistance of the battery will increase seriously, which will affect electrochemical performance of the battery during normal operation. Preferably, $1 \text{ µm} \leq H \leq 20 \text{ µm}$, more preferably $3 \text{ µm} \leq H \leq 10 \text{ µm}$.

Usually, the underlying positive active material layer and the upper positive active material layer are not easily separated after coating and drying. Therefore, in the present invention, the underlying positive active material layer and the upper positive active material layer are collectively referred to as a film layer. Therefore, the binding force between the film layer and the current collector is equivalent to the binding force between the underlying positive active material layer and the current collector. Preferably, the binding force between the underlying positive active material layer and the current collector is preferably 10 N/m or more. Larger binding force can ensure that the underlying positive active material layer effectively and reliably wraps the current collector and metal burrs generated in the current collector under abnormal conditions such as nailing penetration.

The inventors have also found that in the present invention, the elongation of the film layer has a certain influence on the safety performance of the electrode plate in the case of nail penetration.

For positive active material layer of the conventional lithium ion battery (i.e., a film layer without the underlying positive active material layer), its elongation is generally not more than 1%, and it cannot function to wrap metal burrs, so bare metal burrs are liable to cause short circuit inside the battery. According to the positive electrode plate of the present invention, the elongation of the film layer is greatly improved due to the introduction of the underlying positive active material layer, which may wrap the metal burrs that may be generated in the current collector to prevent the occurrence of short circuit in the battery, thereby greatly improving the safety performance of the battery during nail penetration.

As a further improvement of the present invention, the film layer has an elongation of 30% or more, preferably 80% or more. The advantage of the larger elongation is that in the abnormal situation such as nail penetration, the film layer with larger elongation can wrap metal burrs that may be generated in the current collector to prevent the occurrence of short circuit in the battery, thereby greatly improving the safety performance of the battery during nail penetration.

The elongation of the film layer can be adjusted by changing the type, relative amount, molecular weight, degree of crosslinking, and the like of the first polymer material in the underlying positive active material layer. If the content of the first polymer material in the underlying positive active material layer is increased, it is inevitably beneficial to the expansion of the film layer. However, if the content of the first polymer material in the underlying positive active material layer is too large, the content of the conductive material will be relatively low, thereby causing a large increase in DCR of the battery during normal operation. Therefore, it is preferred that the film layer has an elongation of 80% or more and 300% or less.

II. Upper Positive Active Material Layer

The upper positive active material layer used in the positive electrode plate of the present invention may be the conventional positive active material layers commonly used in the art, which also comprises a positive active material (a second positive active material), an binder (a second polymer material) and a conductive material (a second conductive material). The composition of above upper positive active material layer is the same as that of the conventional positive active material layer used in the prior positive electrode plate, which constitution and preparation process are well known in the art. However, there is a limit on the content of each components in the upper positive active material layer. Based on the total weight of the upper positive active material layer, the weight percentage of the second positive active material is A'%, the weight percentage of the second polymer material is B'% and the weight of the second conductive material is C'%, which fulfils the following relationships: A%<A'%, B%>B'% and C%⩾C'%.

Those skilled in the art can reasonably determine the range of A'%, B'%, C'% according to A%, B%, C% of the underlying positive active material layer. Their range may be, for example, as follows: the second positive active material satisfies 90 wt %⩽A'% ⩽99 wt %, the second polymer material satisfies 0.5 wt %⩽B'%⩽5 B'%, and the second conductive material satisfies 0.5 wt %⩽C'%⩽5 wt %.

In the present invention, the types of the polymer material, of the positive active material, and of the conductive material used in the underlying positive active material layer and the upper positive active material layer may be different or may be the same (or partially the same).

The positive active material in the upper positive active material layer may be various positive active materials for preparing a lithium ion secondary battery positive electrode known to those skilled in the art. For example, the positive active material is a lithium-containing composite metal oxide, such as $LiCoO_2$, $LiNiO_2$, $LiMn_2O_4$, $LiFePO_4$, one or more of lithium nickel cobalt manganese oxide (such as $LiNi_{0.5}Co_{0.2}Mn_{0.3}O_2$) and one or more of lithium nickel manganese oxide.

The second polymer material (binder) in the upper positive active material layer may be, for example, a conventional binder such as PVDF, PVDC, SBR, CMC, polyacrylate, polycarbonate, polyethylene oxide or the like.

The second conductive material in the upper positive active material layer may be, for example, a conventional conductive agent such as at least one of conductive carbon black, acetylene black, graphite, graphene, carbon nanotubes, and carbon nanofibers.

III. Current Collector

For the current collector, the common materials in the art, preferably metal current collectors, such as metal flakes or metal foils of stainless steel, aluminum, copper, titanium or the like can be used. The current collector usually has a thickness of 4 μm~16 μm.

Preferably, the current collector is an aluminum-containing porous current collector (for example, a porous aluminum foil). Use of the porous aluminum foil can reduce the probability of occurrence of the metal burrs and further reduce the probability of occurrence of a severe aluminothermic reaction in an abnormal situation such as nailing. Therefore, safety performance of the battery may be further improved. In addition, the use of porous aluminum foil can also improve infiltration of the electrolyte to the electrode plate, and thereby improve the dynamic performance of the lithium ion battery. The underlying positive active material layer can cover the surface of the porous aluminum foil to prevent leakage of the upper active material layer during the coating process.

Further, in consideration of the safety performance during nail penetration, the elongation at break of the current collector has a great influence on safety performance of the battery. If the elongation at break of the current collector is too large, the metal burrs will be larger when puncture, which is not conducive to improving safety performance of the battery. Conversely, if the elongation at break of the current collector is too small, breakage is likely to occur during processing such as plate compaction or when the battery is squeezed or collided, thereby degrading quality or safety performance of the battery. Therefore, in order to further improve safety performance, particularly those during nail penetration, the elongation at break δ of the current collector should be no more than 4% and not less than 0.8%. The elongation at break of the metal current collector can be adjusted by changing purity, impurity content and additives of the metal current collector, the billet production process, the rolling speed, the heat treatment process, and the like.

IV. Positive Electrode Plate

The positive electrode plate of the battery according to the present invention can be formed by a conventional method. For example, the first positive active material, the first polymer material, the first conductive material, and optionally other auxiliary agents are dissolved in a solvent with stirring to form a slurry, and then the slurry is applied over the current collector followed by heating and drying, thereby obtaining the underlying positive active material layer. Then the second positive active material, the second polymer material, the second conductive material, and optionally other auxiliary agents are dissolved in a solvent with stirring to form a slurry, and then the slurry is applied over the underlying positive active material layer followed heating and drying, thereby obtaining the upper positive active material layer. Then, the current collector containing the underlying positive active material layer and the upper positive active material layer is subjected to post-treatment such as cold pressing, trimming, cutting and the like to obtain a desired positive electrode plate.

Those skilled in the art will appreciate that various definition or preferred ranges of the component selection, component content, and material physicochemical properties (thickness, particle size, specific surface area, elongation at break, etc.) in the various embodiments of the present invention mentioned above can be combined arbitrarily. The combined embodiments are still within the scope of the invention and are considered as part of the disclosure.

V. The Present Battery

The present battery comprises the positive electrode plate as mentioned above, a separator and a negative electrode plate. The negative electrode plate for use in conjunction with the positive electrode plate of the present invention may be selected from various conventional negative electrode plates in the art, and the constitution and preparation thereof are well known in the art. For example, the negative electrode plate may comprises a negative electrode current collector and a negative active material layer disposed on the negative electrode current collector, and the negative active material layer may comprise a negative active material, an binder, a conductive material, and the like. The negative active material is, for example, a carbonaceous material such as graphite (artificial graphite or natural graphite), conductive carbon black, carbon fiber, or the like, a metal or a semimetal material such as Si, Sn, Ge, Bi, Sn, In, or an alloy thereof, and a lithium-containing nitride or a lithium-containing oxide, a lithium metal or a lithium aluminum alloy.

The separator used in the battery of the present invention may be selected from various separators commonly used in the art.

The battery of the present invention typically also comprises an electrolyte. Various electrolytes commonly used in the art, such as solutions of electrolytic salts in non-aqueous solvents, may be used. The electrolytic lithium salt may be selected from one or more of lithium hexafluorophosphate (LiPF$_6$), lithium perchlorate, lithium tetrafluoroborate, lithium hexafluoroarsenate, lithium halide, lithium chloroaluminate, and lithium fluoroalkylsulfonate. The organic solvent may be selected from chain carbonates, cyclic carbonates, and a mixture thereof. The chain carbonate may be at least one of dimethyl carbonate (DMC), diethyl carbonate (DEC), ethyl methyl carbonate (EMC), methyl propyl carbonate (MPC), dipropyl carbonate (DPC), and other chain-like organic esters containing fluorine, sulfur or an unsaturated bond. The cyclic carbonate may be one or more of ethylene carbonate (EC), propylene carbonate (PC), vinylene carbonate (VC), γ-butyrolactone (γ-BL), sultone and other cyclic organic esters containing fluorine, sulfur or an unsaturated bond.

The battery of the present invention may be a primary battery or a secondary battery. The battery of the preset invention may be a lithium-ion battery or a sodium-ion battery, preferably a lithium-ion battery, such as a lithium-ion primary battery or a lithium-ion secondary battery. In addition to the use of the positive electrode plate as described above, the construction and preparation methods of these batteries are known per se. Due to the use of the positive electrode plate as described above, the battery can have improved safety (e.g., during nail penetration) and electrical performances. Furthermore, the positive electrode plate according to this application can be easily processed, so that the manufacturing cost of the battery can be reduced by using the positive electrode plate according to the present invention.

EXAMPLES

In order to make the objects, the technical solutions and the beneficial technical effects of the present invention more clear, the present invention will be described in further detail below with reference to the embodiments. However, it is to be understood that embodiments of the present invention are only intended to be illustrative of the present invention, and are not intended to limit the invention, and embodiments of the present invention are not limited to those embodiments given in the specification. The experimental conditions not indicated in the examples may refer to conventional conditions, or the conditions recommended by the material supplier or equipment supplier.

1. Preparation Method

The electrodes and batteries in the respective examples and comparative examples were prepared as follows unless otherwise specified.

1.1 Preparation of Positive Electrode Plate

1) Application of Underlying Active Material Layer

A certain ratio of a first polymer material including a binding layer matrix and an optional binder, a first conductive material, a first positive active material (or an inorganic filler) were mixed with N-methyl-2-pyrrolidone (NMP) as a solvent with stirring uniformly, which was then coated on both sides of metal current collector, followed by drying at 85° C. to obtain a binding layer.

2) Application of Upper Active Material Layer

Then, 90 wt % of a second positive active material, 5 wt % of SP (a second conductive material), and 5 wt % of PVDF (a second polymer material) were mixed with NMP as a solvent with stirring uniformly, which was then coated on the underlying positive active material of the current collector as prepared according to the above method followed by drying at 85° C. to obtain a upper positive active material layer.

3) Preparation of Electrode Plate

Then, the current collector with two layers of positive active material was cold-pressed, then trimmed, cut, and stripped, followed by drying under vacuum at 85° C. for 4 hours. After welding, the positive electrode plate meeting the requirements of the secondary battery was obtained.

The main materials used in the specific examples were as follows:

Binder used in the underlying active material layer: PVDF (Manufacturer "Solvay", model 5130);

Binding layer matrix: polyacrylonitrile, polyacrylonitrile-acrylate, polyacrylate;

First conductive material (conductive agent): Super-P (TIMCAL, Switzerland, abbreviated as SP);

First positive active material: lithium iron phosphate (abbreviated as LFP), carbon coating modified lithium iron phosphate (abbreviated as LFP/C), carbon coating modified lithium titanate (abbreviated as Li$_4$Ti$_5$O$_{12}$/C);

Inorganic filler: alumina; and

Second positive active material: NCM811 (LiNi$_{0.8}$Co$_{0.1}$Mn$_{0.1}$O$_2$).

The above materials were commonly used materials in the lithium battery industry which may be commercially available from the corresponding suppliers.

1.2 Preparation of Negative Electrode Plate

Negative electrode plate was prepared as follows: active material graphite, conductive agent Super-P, thickener CMC, binder SBR were added to deionized water as a solvent at a mass ratio of 96.5:1.0:1.0:1.5 to form an anode slurry; then the slurry was coated on the surface of the negative electrode current collector in the form of copper foil, and dried at 85° C., then trimmed, cut, and stripped, followed by drying under vacuum at 110° C. for 4 hours. After welding, the negative electrode plate meeting the requirements of the secondary battery was obtained.

1.3 Preparation of Electrolyte

Ethylene carbonate (EC), ethyl methyl carbonate (EMC), and diethyl carbonate (DEC) were mixed at a volume ratio of 3:5:2 to obtain a mixed solvent of EC/EMC/DEC, followed by dissolving the fully dried lithium salt LiPF$_6$ into the mixed organic solvent at a concentration of 1 mol/L to prepare an electrolyte.

1.4 Preparation of the Battery

A polypropylene film with a thickness of 12 μm was used as a separator, and the positive electrode plate, the separator and the negative electrode plate were stacked in order, so that the separator was sandwiched in between the positive electrode plate and the negative electrode plate, and then the stack was wound into a bare battery core. After vacuum baking at 75° C. for 10 h, the electrolyte (prepared as described in "Preparation of electrolyte" above) was injected therein followed by vacuum package and standing for 24 h. After that, the battery core was charged to 4.2 V with a constant current of 0.1 C, and then was charged with a constant voltage of 4.2 V until the current dropped to 0.05 C, and then was discharged to 3.0V with a constant current of 0.1 C. Above charging and discharging processes were repeated twice. Finally, the battery core was charged to 3.8V with a constant current of 0.1 C, thereby completing the preparation of the secondary battery.

2. Tests for Material Performances

In each of the examples and comparative examples, the physical property parameters of the materials were measured by the common method in the art, unless otherwise specified.

Some specific parameters were tested using the following methods.

2.1 Particle Size

The power sample was dispersed in a dispersing medium (distilled water), which was measured with a Malvern laser particle size analyzer MS2000 for 5 times and averaged in unit of μm.

2.2 BET (Specific Surface Area)

The specific surface area of the powder sample of the test material was measured with a Quadrasorb SI specific surface tester for 5 times and averaged in unit of $m^2/g$.

2.3 Binding Force between Film Layer and Current Collector

The electrode plate containing a film layer on both sides of the current collector was cut into a sample to be tested having a width of 2 cm and a length of 15 cm. One side of the sample to be tested was uniformly adhered to a stainless steel plate at 25° C. under normal pressure by using 3M double-sided tape. One end of the sample to be tested was fixed on a GOTECH tensile machine, and the film layer of the sample to be tested was stripped from the current collector by using the GOTECH tensile machine, wherein the maximum tensile force was read according to the data diagram of the tensile force and the displacement. The resulting value (in unit N) was divided by 0.02 to calculate the binding force (N/m).

2.4 Elongation at Break of Current Collector

Two samples having a length of 200 mm and a width of 15 mm were taken from the current collector. The sample was then mounted on a tensile machine (model AI7000) and the two tests were averaged as the test result. Record the initial length L0, and start the tensile machine, until the sample broke, and read the displacement L1 of the sample at break from the tensile machine. Elongation at break=(L1−L0)/L0*100%.

2.5 Thickness of Current Collector, Thickness of Coating and Thickness of Film Layer Thickness of the current collector was measured by a micrometer at 5 points and averaged.

Thickness of the coating and thickness of the film layer: first measure the thickness of the current collector, and then measure the total thickness of the current collector with the coating. The difference between the two values was used as the thickness of the coating. A similar method was used for the thickness of the film layer.

2.6 Cracking of Coating

After drying and obtaining a positive active material layer, if no cracks were observed in the 100 $m^2$ electrode plate, it was defined as no cracking; if the number of occurrences of cracks in 100 $m^2$ electrode plate was ≤3, it was defined as mild cracking; if the number of occurrences of cracks in 100 $m^2$ electrode plate was >3, it was defined as severe cracking.

2.7 Solubility of Polymer Material in Oil Solvent

The polymer material was made into a binding film having a thickness of about 7 μm, then cut into 20 mm*50 mm strips, weighed and recorded as M1;

The binding film was placed in NMP (N-methylpyrrolidone) solvent, set at 130° C. for 5 min, taken out, and vacuum dried at 100° C. After drying, it was weighed and recorded as M2;

Then solubility was calculated as=(M1-M2)/M1*100%

In the present invention, for convenience of comparison, the solubility of PVDF (manufacturer "Solvay", model 5130) was used as a control, and it was recorded as 100%. The ratio of the solubility of other materials to the solubility of PVDF was recorded.

2.8 Elongation of Film Layer

Removal of the current collector from the electrode plate: take the positive electrode plate out of the battery core and add the electrolyte, so that the electrode plate was completely immersed in the electrolyte, which was stored at 90° C. for more than 48 h, and then taken out. After that, the film layer of the positive electrode plate can be peeled off from the current collector.

The resulting film layer was used to prepare a sample having a width of 20 mm and a length of 50 mm. The sample was then mounted on a tensile machine (model AI7000) and the initial length L0 was recorded. Start the tensile test until the sample breaks. The displacement L1 of the sample at break was read from the tensile machine. The elongation= (L1−L0)/L0*100%.

3. Test for Battery Performance

The safety performances of the secondary batteries from various examples and comparative examples were evaluated using GBT31485-2015 "Safety Requirements and Test Methods for Traction Battery of Electric Vehicle", and the test results were recorded.

3.1 Puncture Test:

The secondary battery was fully charged to the charging cut-off voltage with a current of 1 C, and then charged with a constant voltage until the current dropped to 0.05 C. After that, charging was terminated. A high temperature resistant steel needle of φ5-10 mm (the tip thereof had a cone angle of)45° was used to puncture the battery plate at a speed of 25 mm/s in the direction perpendicular to the battery plate. The puncture position should be close to the geometric center of the surface to be punctured, the steel needle stayed in the battery, and then observe if the battery had an indication of burning or exploding.

20 Battery Samples were Measured with the Above Test.

3.2 Overcharge Test:

The secondary battery was fully charged to the charging cut-off voltage with a current of 1 C, and then charged with a constant voltage until the current dropped to 0.05 C. After that, charging was terminated. Then, after charging with a constant current of 1 C to reach 1.5 times the charging cut-off voltage or after charging with a constant current of 1 C for 1 hour, the charging was terminated.

20 battery samples were measured with the above test.

3.3 Cycle Performance Test:

The test conditions for the cycle performance test were as follows: the secondary battery was subjected to a 1 C/1 C cycle test at 25° C. in which the charging and discharging voltage range was 2.8 to 4.2 V. The test was terminated when the capacity was attenuated to 80% of the first discharging specific capacity.

3.4 DC Resistance Growth Test

The secondary battery was fully charged to the charging cut-off voltage with a current of 1 C, and then charged with a constant voltage until the current was reduced to 0.05 C. After that, the charging was terminated and the DC resistance of the battery core was tested (discharging with a current of 4 C for 10 s). Then, the battery core was placed at 130° C. for 1 h followed by testing the DC resistance, and calculating the DC resistance growth. Then, the battery core was placed at 130° C. for 2 h followed by testing the DC resistance, and calculating the DC resistance growth.

3.5 DCR Test

The secondary battery was adjusted to 50% SOC with a current of 1 C at 25° C., and the voltage U1 was recorded. Then, it was discharged with a current of 4 C for 30 seconds, and the voltage U2 was recorded. DCR=(U1−U2)/4 C.

In the present invention, for convenience of comparison, the DCR of the battery core in which the polymer material only containing PVDF was used as a control, and was recorded as 100%, and the DCR of the other battery cores and the ratio thereof were calculated and recorded.

4. Performance Test Results 4.0 Solubility of Binding Layer Matrix

The different polymer materials were selected and the solubility was measured as described in "2.7 Solubility in NMP at 130° C. for 5 min". The results are as follows:

Solubility in NMP at 130° C. for 5 min

| Materials | solubility |
| --- | --- |
| PVDF | 100% |
| Polyacrylonitrile | 8% |
| Polyacrylonitrile-acrylate | 12% |
| polyacrylate | 15% |

The above results show that polyacrylonitrile, polyacrylonitrile-acrylate and polyacrylate are all an oil dispersible polymer material having a solubility in NMP at 130° C. for 5 min, which is 30% or less of the solubility of PVDF under the same conditions. These materials may be used as binding layer matrix material in the first polymer material of the present invention.

4.1 Protection Performance of Underlying Positive Active Material Layer and Effect thereof on Battery Performance In order to confirm the protection performance of underlying positive active material layer, the corresponding underlying positive active material layer, positive electrode plate, negative electrode plate and battery were prepared with the specific materials and amounts listed in Table 1-1 below according to the methods and procedures described in "1. Preparation method", and were tested according to the method specified in "3. Tests for battery performance". In order to ensure accuracy of data, 4 samples were prepared for each battery (20 samples for the puncture test and overcharge test) and tested independently. The final test results were averaged and shown in Table 1-2.

In the test, the conventional electrode plate CPlate P was prepared with the method described in "1.1 Preparation of positive electrode plate", but the underlying positive active material layer was not provided. That is to say, a upper positive active material was directly applied over the current collector. The conventional electrode plate Cplate N was prepared according to the method described in "1.2 Preparation of negative electrode plate".

TABLE 1-1

Compositions of electrode plate

| | | | Composition of the underlying positive active material layer | | | | | | |
| --- | --- | --- | --- | --- | --- | --- | --- | --- | --- |
| | Current collector | Second positive active material | First polymer material | wt % | First conductive material | wt % | First positive active material | wt % | Thickness of underlying positive active material layer H (μm) |
| CPlate P | Al foil | NCM811 | / | / | / | / | / | / | / |
| Comp. Plate 1 | Al foil | NCM811 | PVDF | 55 | SP | 15 | LFP/C | 30 | 5 |
| Plate 1 | Al foil | NCM811 | polyacrylonitrile | 55 | SP | 15 | LFP/C | 30 | 5 |
| Plate 2 | Al foil | NCM811 | Polyacrylonitrile-acrylate | 55 | SP | 15 | LFP/C | 30 | 5 |
| Plate 3 | Al foil | NCM811 | Polyacrylate | 55 | SP | 15 | LFP/C | 30 | 5 |
| Comp. Plate 1 | Al foil | NCM811 | polyacrylate | 80 | SP | 20 | / | / | 5 |

TABLE 1-2

Performances of lithium-ion batteries

| Battery No. | Positive electrode plate | Negative electrode plate | Puncture Test (20 samples) | cracking | DCR |
| --- | --- | --- | --- | --- | --- |
| Battery 1 | CPlate P | CPlate N | 0 pass | No cracking | 75% |
| Battery 2 | Comp. Plate 1 | CPlate N | All pass | Severe cracking | 100% |
| Battery 3 | Plate 1 | CPlate N | 10 pass | No cracking | 84% |
| Battery 4 | Plate 2 | CPlate N | 12 pass | No cracking | 88% |
| Battery 5 | Plate 3 | CPlate N | 15 pass | No cracking | 92% |
| Battery 6 | Comp. Plate 2 | CPlate N | 3 pass | No cracking | 90% |

The data in Table 1-1 and Table 1-2 indicated that (1) If a polymer material (for example, PVDF) having a relatively large dissolution or swelling is used as the matrix material of the underlying positive active material layer, cracking and DCR deterioration of the battery may occur. The polymer material having a relatively small dissolution and swelling such as polyacrylonitrile or the like as the matrix material of the underlying positive active material layer may obviously solve the above problems. Over the conventional positive electrode plate, those with the underlying positive active material layer composed of the polymer material having a relatively small dissolution and swelling such as polyacrylonitrile can also significantly improve the safety performance of the battery during nail penetration;

(2) For the electrode plate in which the first positive active material (LFP/C) is not added to the underlying positive active material layer, since the underlying positive active material layer is deformed or destroyed, the anti-piercing effect of the electrode plate cannot be ensured. The underlying positive active material layer with the first positive active material can effectively improve the safety performance of the battery during nail penetration.

Comprehensively considering factors such as nail penetration performance, cracking and battery resistance DCR, the batteries 3, 4, and 5 using the electrode plates 1, 2, and 3 have the most balanced performance which have relatively a good safety performance during nail penetration while no coating cracking occurs and DCR is acceptable.

4.2 Effect of the Content of each Component contained in the Underlying Positive Active Material Layer In order to further study the effect of the content of each component contained in the underlying positive active material layer, the corresponding underlying positive active material layer, positive electrode plate, negative electrode plate and battery were prepared with the specific materials and amounts listed in Table 2-1 below according to the methods and procedures described in "1. Preparation method", and then were tested according to the method specified in "3. Test for battery performance". In order to ensure the accuracy of data, 4 samples were prepared for each battery (20 samples for the puncture test or overcharge test) and tested independently. The final test results were averaged and shown in Table 2-2.

of the underlying positive active material layer decreases and the underlying positive active material layer cannot exert its effect of improving the safety performance during nail penetration; (2) the first conductive material has a great influence on the internal resistance and polarization of the battery, so it would affect the cycle life of the battery. The higher the content of the first conductive material, the smaller the internal resistance and polarization of the battery is so that the cycle life will be better.

It had been found through experiments that the appropriate content range of each component in the underlying positive active material layer is as follows:

the weight percentage of the first polymer material is 35 wt % to 75 wt %;

the weight percentage of the first conductive material is 5 wt % to 25 wt %; and the weight percentage of the first positive active material is from 10 wt % to 60 wt %.

TABLE 2-1

Compositions of electrode plate

Composition of the underlying positive active material layer

| | Current collector | Second positive active material | First polymer material (matrix) material | wt % | First conductive material | wt % | First positive active material | wt % | Thickness of underlying positive active material layer H (μm) |
|---|---|---|---|---|---|---|---|---|---|
| Plate-1 | Al foil | NCM811 | polyacrylonitrile | 55 | SP | 15 | LFP/C | 30 | 5 |
| Comp. Plate1-1 | Al foil | NCM811 | polyacrylonitrile | 15 | SP | 20 | LFP/C | 65 | 5 |
| Comp. Plate1-2 | Al foil | NCM811 | polyacrylonitrile | 85 | SP | 5 | LFP/C | 10 | 5 |
| Comp. Plate1-3 | Al foil | NCM811 | polyacrylonitrile | 25 | SP | 5 | LFP/C | 70 | 5 |
| Plate1-4 | Al foil | NCM811 | polyacrylonitrile | 75 | SP | 15 | LFP/C | 10 | 5 |
| Plate1-5 | Al foil | NCM811 | polyacrylonitrile | 75 | SP | 10 | LFP/C | 15 | 5 |
| Plate1-6 | Al foil | NCM811 | polyacrylonitrile | 60 | SP | 10 | LFP/C | 30 | 5 |
| Plate1-7 | Al foil | NCM811 | polyacrylonitrile | 50 | SP | 20 | LFP/C | 30 | 5 |
| Plate1-8 | Al foil | NCM811 | polyacrylonitrile | 50 | SP | 25 | LFP/C | 25 | 5 |
| Plate1-9 | Al foil | NCM811 | polyacrylonitrile | 35 | SP | 5 | LFP/C | 60 | 5 |

TABLE 2-2

Performance of lithium-ion batteries

| Battery | Positive electrode | Negative electrode | Puncture Test (20 batteries) | Cycle Life (cycle) |
|---|---|---|---|---|
| Battery 3 | Plate 1 | CPlate N | 10 pass | 1600 |
| Battery 3-1 | Comp. Plate 1-1 | CPlate N | 5 pass | 1880 |
| Battery 3-2 | Comp. Plate 1-2 | CPlate N | 15 pass | 1170 |
| Battery 3-3 | Comp. Plate 1-3 | CPlate N | 12 pass | 1060 |
| Battery 3-4 | Plate 1-4 | CPlate N | 13 pass | 1300 |
| Battery 3-5 | Plate 1-5 | CPlate N | 14 pass | 1200 |
| Battery 3-6 | Plate 1-6 | CPlate N | 12 pass | 1250 |
| Battery 3-7 | Plate 1-7 | CPlate N | 10 pass | 1900 |
| Battery 3-8 | Plate 1-8 | CPlate N | 9 pass | 1890 |
| Battery 3-9 | Plate 1-9 | CPlate N | 8 pass | 1300 |

The data in Table 2-1 and Table 2-2 show that: (1) If the content of the first positive active material is too low, the underlying positive active material layer is easily deformed and its stability is not high, so safety performance of the battery cannot be fully improved; if the content of the first positive active material is too high, the content of the binding layer matrix material is too low, so that the ductility As long as the content of each component in the underlying positive active material layer is within the above range, the effect of improving the safety and electrical performance (e.g., cycle performance) of the battery can be achieved.

4.3 Effect of the Kind of the First Positive Active Material on Battery Performance In order to further study the effect of materials in the underlying positive active material layer on performances of the electrode plate and the battery, the corresponding underlying positive active material layer, positive electrode plate, negative electrode plate and battery were prepared with the specific materials and amounts listed in Table 3-1 below according to the methods and procedures described in "1. Preparation method", and were tested according to the method specified in "3. Test for battery performance". In order to ensure accuracy of data, 4 samples were prepared for each battery (20 samples for the puncture test or overcharge test) and tested independently. The final test results were averaged which were shown in Table 3-2.

TABLE 3-1

Compositions of electrode plate

Composition of the underlying positive active material layer

| | Current collector | Second positive active material | First polymer material | wt % | First conductive material | wt % | First positive active material | wt % | Thickness of underlying positive active material layer H (μm) |
|---|---|---|---|---|---|---|---|---|---|
| Plate-1 | Al foil | NCM811 | polyacrylonitrile | 55 | SP | 15 | LFP/C | 30 | 5 |
| Plate1-11 | Al foil | NCM811 | polyacrylonitrile | 55 | SP | 15 | Alumina | 30 | 5 |
| Plate1-12 | Al foil | NCM811 | polyacrylonitrile | 55 | SP | 15 | $Li_4Ti_5O_{12}/C$ | 30 | 5 |

TABLE 3-2

Performances of lithium-ion batteries

| Battery | Positive electrode | Negative electrode | Puncture Test | Overcharge Test |
|---|---|---|---|---|
| Battery 3 | Plate 1 | CPlate N | 10 pass | All pass |
| Battery 3-11 | Plate 1-11 | CPlate N | 9 pass | No pass |
| Battery 3-12 | Plate 1-12 | CPlate N | 10 pass | All pass |

The data in Tables 3-1 and 3-2 show that (1) alumina can be used as an inorganic filler to improve the safety performance of the battery during nail penetration; (2) compared to other materials (such as alumina), the electrochemically active material (i.e. first positive active material) can further significantly improve the overcharge safety performance of the battery.

4.4 Effect of Binder on Battery Performance

In order to further study the effect of binder in the underlying positive active material layer on performances of the electrode plate and the battery, the corresponding underlying positive active material layer, positive electrode plate, negative electrode plate and battery were prepared with the specific materials and amounts listed in Table 4-1 below according to the methods and procedures described in "1. Preparation method", and were tested according to the method specified in "3. Test for battery performance". In order to ensure accuracy of data, 4 samples were prepared for each battery (20 samples for the puncture test or overcharge test) and tested independently. The final test results were averaged which were shown in Table 4-2.

The data in Table 4-1 and Table 4-2 show that after the polymer binder PVDF is added to the underlying positive active material layer, the safety performance of the battery during nail penetration is further improved, especially when the content of PVDF is above 15% by weight. However, due to the large dissolution and swelling of PVDF in NMP, the DCR of the battery is deteriorated and the cracking of the coating occurs when the content of polyacrylonitrile is too small It will be understood by those skilled in the art that the above application examples of the electrode plate of the present invention are only exemplified to be used for a lithium battery, but the electrode plate of the present invention can also be applied to other types of batteries or electrochemical devices, and still may produce good technical effect of the present invention.

It will be apparent to those skilled in the art that the present application may be modified and varied in accordance with the above teachings. Accordingly, the present application is not limited to the specific embodiments disclosed and described above, and modifications and variations of the present application are intended to be included within the scope of the claims of the present application. In addition, although some specific terminology is used in this specification, these terms are for convenience of illustration only and are not intended to limit the present application in any way.

TABLE 4-1

Compositions of electrode plate

Composition of the underlying positive active material layer

| | Current collector | Second positive active material | First polymer material | | | | First conductive material | | First positive active material | | Thickness of underlying positive active material layer H (μm) |
|---|---|---|---|---|---|---|---|---|---|---|---|
| | | | Matrix | wt %[1] | Polymer binder | wt %[2] | Wt %[3] | Material | wt % | material | wt % | |
| Plate 1 | Al foil | NCM811 | polyacrylonitrile | 55 | / | 0 | 100 | SP | 15 | LFP/C | 30 | 5 |
| Plate 1-13 | Al foil | NCM811 | polyacrylonitrile | 41.3 | PVDF | 13.7 | 75 | SP | 15 | LFP/C | 30 | 5 |
| Plate 1-14 | Al foil | NCM811 | polyacrylonitrile | 38.5 | PVDF | 16.5 | 70 | SP | 15 | LFP/C | 30 | 5 |
| Plate 1-15 | Al foil | NCM811 | polyacrylonitrile | 27.5 | PVDF | 27.5 | 50 | SP | 15 | LFP/C | 30 | 5 |
| Plate 1-16 | Al foil | NCM811 | polyacrylonitrile | 16.5 | PVDF | 38.5 | 30 | SP | 15 | LFP/C | 30 | 5 |

[1], [2] the weight percentage relative to the total weight of the underlying positive active material layer;

[3] the weight percentage of the binding layer matrix relative to the total weight of the first polymer material, i.e. binding layer matrix + polymer binder

TABLE 4-2

Performances of lithium-ion batteries

| Battery | Positive electrode | Negative electrode | Puncture Test | Battery DCR | Cracking |
|---|---|---|---|---|---|
| Battery 3 | Plate 1 | CPlate N | 10 pass | 84% | No cracking |
| Battery 3-13 | Plate 1-13 | CPlate N | 12 pass | 86% | No cracking |
| Battery 3-14 | Plate 1-14 | CPlate N | 15 pass | 88% | No cracking |
| Battery 3-15 | Plate 1-15 | CPlate N | 18 pass | 90% | No cracking |
| Battery 3-16 | Plate 1-16 | CPlate N | All pass | 92% | Mild cracking |

The invention claimed is:

1. A battery, comprising a positive electrode plate, a separator and a negative electrode plate,
wherein the positive electrode plate comprises a positive electrode current collector and at least two layers of positive active materials on at least one surface of the positive electrode current collector, comprising an underlying positive active material layer in contact with the positive electrode current collector and an upper positive active material layer in contact with the underlying positive active material layer and away from the positive electrode current collector
in which the underlying positive active material layer comprises a first positive active material, a first polymer material, and a first conductive material, based on the total weight of the underlying positive active material layer, the first positive active material is present in an amount of A% by weight, the first polymer material is present in an amount of B% by weight, and the first conductive material is present in an amount of C% by weight and
in which the upper comprises a second positive active material, a second polymer material, and a second conductive material, based on the total weight of the upper positive active material layer, the second positive active material is present in an amount of A'% by weight, the second polymer material is present in an amount of B'% by weight, and the second conductive material is present in an amount of C'% by weight
wherein A%<A'%, B%>B'%, and C%≥C'% and
the first polymer material comprises an oil-dispersible polymer material having a solubility in NMP at 130° C. for 5 minutes, which is 30% or less of the solubility of PVDF under the same conditions, and
wherein the first positive active material fulfils 10 wt %≤A%≤60 wt %, the first polymer material fulfils 35 wt %≤B%≤75 wt % and the first conductive material fulfils 5 wt %≤C%≤25 wt %; and
the second positive active material fulfils 90 wt %≤A'%≤99wt %, the second polymer material fulfils 0.5 wt %≤B'%≤5 wt % and the second conductive material fulfils 0.5 wt %≤C'%≤5 wt %.

2. The battery according to claim 1, wherein the first polymer material is consisted of the oil-dispersible polymer material or is a mixture material consisting of the oil-dispersible polymer material and a polymer binder, relative to the total weight of the first polymer material, the oil-dispersible polymer material is present in an amount of 30 wt % to 100 wt %, and the polymer binder is present in an amount of 0 wt % to 70 wt %.

3. The battery according to claim 2, wherein the polymer binder is fluorinated polyolefin and/or chlorinated polyolefin.

4. The battery according to claim 1, wherein the oil-dispersible polymer material in the first polymer material is present in an amount of 20 wt % or more relative to the total weight of the underlying positive active material layer.

5. The battery according to claim 3, wherein the oil-dispersible polymer material is selected from at least one of oil-dispersible polyacrylonitrile, oil-dispersible polyacrylic acid, oil-dispersible polyacrylate, oil-dispersible polyacrylic acid-acrylate, oil-dispersible polyacrylonitrile-acrylic acid, and oil-dispersible polyacrylonitrile-acrylate.

6. The battery according to claim 4, wherein the fluorinated polyolefin and/or chlorinated polyolefin is selected from at least one of polyvinylidene fluoride (PVDF), carboxylic acid modified PVDF, acrylic acid modified PVDF, polyvinylidene chloride (PVDC), carboxylic acid modified PVDC, acrylic acid modified PVDC, PVDF copolymer and PVDC copolymer.

7. The battery according to claim 1, wherein the first conductive material is selected from at least one of a conductive carbon-based material, a conductive metal material, and a conductive polymer material; and
wherein the conductive carbon-based material is selected from at least one of conductive carbon black, acetylene black, graphite, graphene, carbon nanotubes, and carbon nanofibers; and
wherein the conductive metal material is selected from at least one of Al powder, Ni powder, and gold powder; and
wherein the conductive polymer material is selected from at least one of conductive polythiophene, conductive polypyrrole, and conductive polyaniline.

8. The battery according to claim 1, wherein the first positive active material is selected from at least one of lithium cobalt oxide, lithium nickel manganese cobalt oxide, lithium nickel manganese aluminum oxide, lithium iron phosphate, lithium vanadium phosphate, lithium cobalt phosphate, lithium manganese phosphate, lithium iron manganese phosphate, lithium iron silicate, lithium vanadium silicate, lithium cobalt silicate, lithium manganese silicate, spinel lithium manganate, spinel lithium nickel manganate, lithium titanate, or a conductive carbon coating modified above material, a conductive metal coating modified above material, or a conductive polymer coating modified above material.

9. The battery according to claim 1, wherein the first positive active material is at least one of lithium iron phosphate, lithium vanadium phosphate, lithium cobalt phosphate, lithium manganese phosphate, lithium iron manganese phosphate, or a conductive carbon coating modified above material, a conductive metal coating modified above material, or a conductive polymer coating modified above material.

10. The battery according to claim 1, wherein the first positive active material has a specific surface area (BET) of no more than 500 m$^2$/g.

11. The battery according to claim 1, wherein the metal current collector has a thickness of 4 μm to 16 μm.

12. The battery according to claim 1, wherein when the two layers of positive active material is collectively referred as a positive film layer, there is a binding force between the positive film layer and the positive electrode current collector of 10 N/m or more and the positive film layer has an elongation of 30% or more.

* * * * *